United States Patent
Wu (10) Patent No.: US 7,477,413 B2
(45) Date of Patent: Jan. 13, 2009

(54) INTERNET FAX APPARATUS WITH AN AUTOMATIC FILING FUNCTION FOR SENDING VIDEO FILES AND A METHOD FOR THE SAME

(75) Inventor: Chao-Hung Wu, 10F, No. 108-1, Min Chaun Rd., Hsintien City, Taipei (TW)

(73) Assignee: Chao-Hung Wu, San Jose, CA (US)

( * ) Notice: Subject to any disclaimer, the term of this patent is extended or adjusted under 35 U.S.C. 154(b) by 764 days.

(21) Appl. No.: 11/010,365

(22) Filed: Dec. 14, 2004

(65) Prior Publication Data

US 2006/0129511 A1    Jun. 15, 2006

(51) Int. Cl.
G06F 15/00 (2006.01)
H04N 1/00 (2006.01)
H04N 7/14 (2006.01)
H04M 11/00 (2006.01)

(52) U.S. Cl. .................. 358/1.15; 358/400; 358/401; 358/452; 348/14.04; 379/88.13

(58) Field of Classification Search ............. 358/1.15, 358/452, 400, 401; 725/105, 118, 126; 348/162, 348/14.06, 14.04; 379/100.06, 100.08, 88.13, 379/88.19; 709/206, 217, 231, 234; 345/716
See application file for complete search history.

(56) References Cited

U.S. PATENT DOCUMENTS

| | | | |
|---|---|---|---|
| 5,847,748 A * | 12/1998 | Laughlin | 725/105 |
| 5,862,202 A | 1/1999 | Bashoura et al. | |
| 6,226,362 B1 * | 5/2001 | Gerszberg et al. | 379/88.13 |
| 6,972,862 B2 * | 12/2005 | Tang et al. | 358/1.15 |
| 7,164,488 B2 * | 1/2007 | Henry | 358/1.15 |
| 7,312,889 B2 * | 12/2007 | Kimoto | 358/1.15 |
| 2002/0012424 A1 * | 1/2002 | Nishio et al. | 379/100.06 |
| 2003/0208543 A1 * | 11/2003 | Enete et al. | 709/206 |
| 2005/0286090 A1 * | 12/2005 | Ahne et al. | 358/452 |

* cited by examiner

*Primary Examiner*—Edward L Coles
*Assistant Examiner*—Charlotte M Baker (57) ABSTRACT

An Internet fax apparatus and its method are proposed. In the present invention, an Internet fax program capable of functioning together with conventional scanners, printers, or a combination of both, is provided. By connecting to a computer, which has the Internet fax program installed therein, with an image-capturing device, a sound-recording device and a handwriting input device, the present invention can attach video or handwritten attachment to a facsimile file and send it via the Internet. Thus, the present invention reduces the cost of sending a fax and provides a powerful and user-friendly facsimile function.

10 Claims, 9 Drawing Sheets

INTERNET FAX APPARATUS WITH AN AUTOMATIC FILING FUNCTION FOR SENDING VIDEO FILES AND A METHOD FOR THE SAME

BACKGROUND OF THE INVENTION

1. Field of the Invention

The present invention is related to an Internet fax apparatus with an automatic filing function for sending video files and a method for the same, and more particularly, to a Internet fax apparatus for sending or receiving files having video information and handwritten text that automatically files the files.

2. Description of Related Art

In the present era, which requires high-speed information propagation, most companies produce, store and send large amounts of information electronically. However, no matter how advanced the information technology environment is, there is still a possibility of files being damaged during transmission. Hence, it is necessary to keep a paper record or copy of a transferred file. For this reason, facsimile is still regarded as the best way to transfer a file.

In order to replace conventional fax machines, one may use a scanner, a printer and a modem that connect with a computer to attain a similar function to that of conventional fax machines via e-mail. One can scan files via the scanner, store their image files in the computer and then use fax software to pass the image files to a remote fax machine or printer to print them out. On the other hand, one can also attach image files to an e-mail and thereby send them out.

Figure 1:
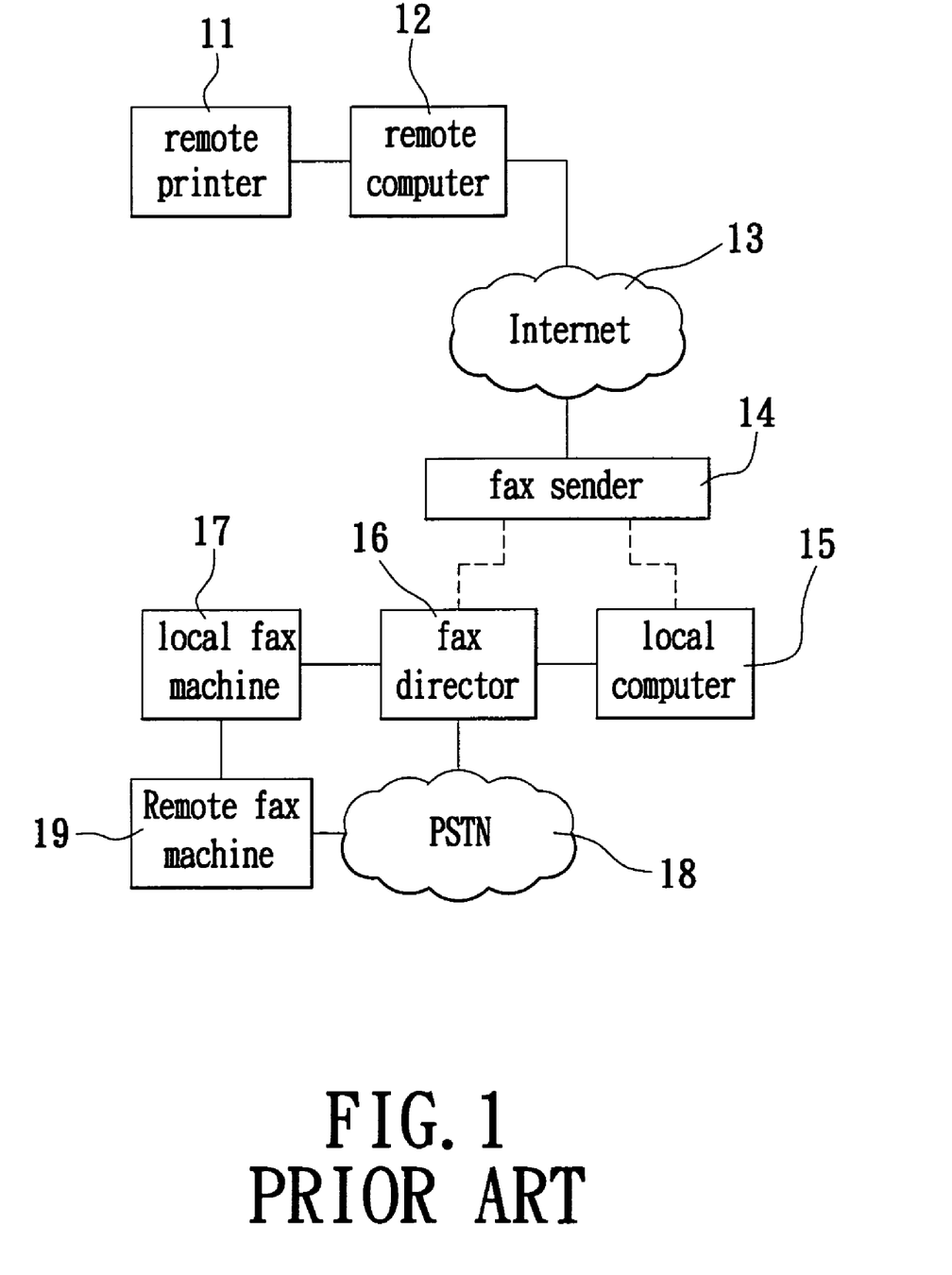
FIG. 1 is a block diagram of a conventional network and apparatuses for facsimile.

Reference is made to FIG. 1, disclosed in U.S. Pat. No. 5,862,202 (application date: Apr. 10, 1997). It is a block diagram of a conventional fax routing system. The local end has a fax director 16 connecting with a local fax machine 17 as well as a local computer 15. The fax director 16 is further connected to a public switch telephone network (PSTN) 18 via a telephone-dedicated wire. Via a fax sender 14, the fax director 16 and the local computer 15 can also be connected to the Internet 13 so as to connect with a remote apparatus, such as a remote computer 12 or a remote printer 11.

Via the system mentioned above, a user at the local end can use the fax director 16 to transfer files in various ways. For example, the user can use the local fax machine 17 and the fax director 16 to send files to the remote fax machine 19 via the PSTN 18; the local fax machine 17 and the fax director 16 to send files to the remote computer 12 via the fax sender 14 as well as the Internet 13 and then print the files via the remote printer 11; or the local computer 15 and the fax sender 14 to send the files to the remote computer 12 and print them via the printer. Thereby, the functions of the fax machine can be achieved.

Currently, the functions of printing, faxing, scanning a hard copy and the function of storing an image file are integrated into a multifunction printer (MFP). However, these conventional functions are simply combined in the MFP. Hence, the MFP still needs to connect with a PSTN to send a fax. Although the MFP is convenient and easy to use, it still has the following drawbacks:

(1) The high cost of sending a fax;
(2) Only black and white files can be transferred;
(3) In general, only A4-sized files can be transferred;
(4) A fax is generally a bad quality reproduction, i.e. handwriting may be distorted or faded;
(5) Members of a household or company usually share the same machine; and
(6) Necessity of occupying a telephone line.

Therefore, if there is a new method capable of resolving the problems mentioned above, it can overthrow all of the conventional methods. Based on this thinking, the present invention is proposed to improve the conventional fax machine and integrate the functions of conventional scanners, printers and photostats. Besides, by using dedicated software, the present invention is capable of functioning together with an image-capturing device, a voice-receiving device and handwriting input device of a computer system and thereby provides a convenient and user-friendly Internet fax apparatus. Via networks and the present invention, virtually everyone can own a MFP allowing them to improve their work efficiency. Consequently, the present invention can enable every person to work independently and make a MFP available to all.

SUMMARY OF THE INVENTION

An objective of the present invention is to provide an Internet fax apparatus and its method. The present invention employs an Internet fax program capable of functioning together with conventional scanners, printers or a combination of both. By connecting to a computer, which has the Internet fax program installed therein, with multi-media peripherals, the present invention can attach video or handwriting text to a facsimile file. Thus, the present invention reduces the cost of sending a fax and provides a powerful and user-friendly facsimile function. In this way, the present invention provides a convenient Internet fax/printing apparatus for video files so that virtually everyone can own a MFP and improve his or her work efficiency thereby. Consequently, the present invention enables anyone to work independently and make a MFP available to all.

For reaching the objective above, the present invention provides an Internet fax apparatus, including a computer connected to the Internet in a wired or a wireless manner; an image-capturing device connected to the compute for recording an image; a sound-recording device connected to the computer for recording a sound; a scanning device connected to the computer for scanning a file; and an Internet fax program installed on the computer and functioning together with the image-capturing device, the sound-recording device and the scanning device. Therein, the Internet fax program is used to record and attach a video message to the file so as to form a video file.

For reaching the objective above, the present invention also provides an Internet fax method, including the following steps: activating the Internet fax program; scanning a file, which is scanned via a scanning device; using the Internet fax program to receive a file of the file in a wireless or wired manner; recording a video message when the file of the file is opened; previewing the video message and the file; selecting at least one receiver; and sending the file of the file attached with the video message.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

The present invention uses an Internet fax program installed on a computer and capable of functioning together with a video apparatus, a scanner and a handwriting input device to attach video or handwritten text to a facsimile file and send it via the Internet. Thereby, the present invention reduces the cost for sending a fax and provides a powerful and user-friendly video facsimile function.

In order to use the present invention, a user having a computer connected to the Internet only needs to install the Internet fax program onto his computer. After that, he can use original peripherals to achieve the Internet facsimile function. If the user at the other end doesn't have the Internet fax program of the present invention, he can receive the facsimile file attached with the video or handwriting attachment in the conventional way of receiving e-mails. If the user at the other end has the Internet fax program, he can directly receive and reply to the file with video or handwritten text attached.

The present invention has the following features:
1. The present invention can be used to attach recorded video data to facsimile files.
2. The present invention can completely print the facsimile files at a remote end.
3. All of the facsimile files or pictures are automatically saved during the facsimile process.
4. The present invention uses a computer to immediately display facsimile files that are received or edited.
5. The present invention can be used to edit a received facsimile file and then send it back immediately.
6. The present invention can deliver a file with a signature without using paper.

Figure 2A:
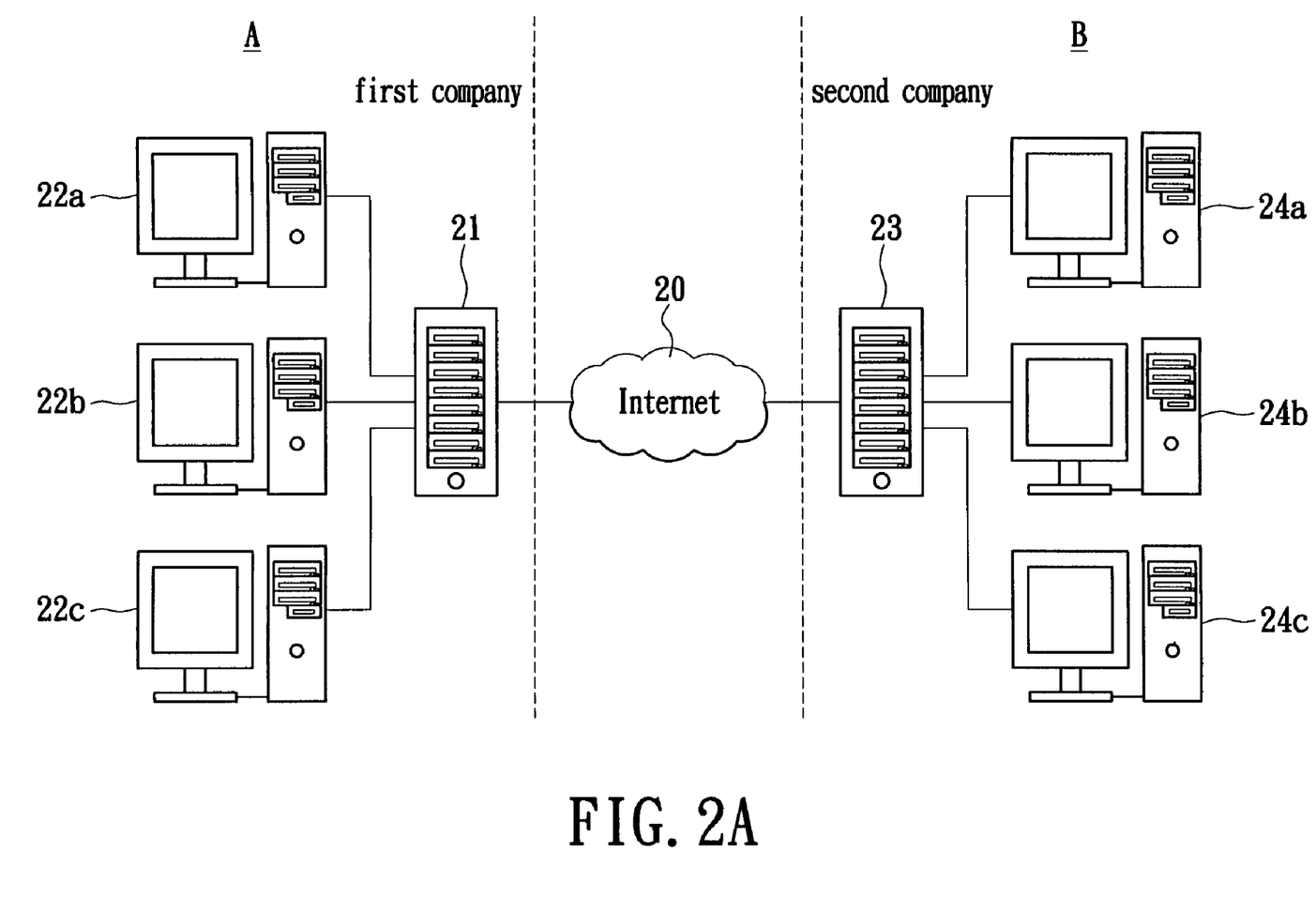
FIG. 2A is a structural diagram of the first embodiment in accordance with the present invention.

Reference is made to FIG. 2A, which is a structural diagram of a preferred embodiment in compliance with the present invention. As shown in the figure, there are two companies using the Internet 20 to transfer video files and file the same. Therein, the employees of the first company A use computers 22a, 22b and 22c to connect with the first server 21 in a wireless or wired manner. Thus, the computers 22a, 22b and 22c can connect with the Internet 20 via the first server 21 as well. The connection method, such as using routers or hubs, isn't detailed here. Additionally, the employees of the second company B use computers 24a, 24b and 24c to connect with the second server 23 in a wireless or wired manner. Furthermore, the second server 23 also connects with the Internet 20 in a wireless or wired manner.

When an employee of the first company A uses a scanner and the computer 22a to compose an electronic file to be faxed, he or she can use the Internet fax software installed on the computer 22a to receive an image of a file from the scanner. Then, the employee can record a video message to explain the file or write an explanatory note on the file by using a handwriting input device. The Internet fax software can also record the status of the handwritten text so that a user who receives the file can easily understand the content of the file.

When the computer 22a sends out the file with the video message and the handwritten text, the file is sent to the user at the other end, such as an employee of the second company, via the Internet 20. Then, the employee can receive the file via the computer 22a. He or she can use e-mail software, such as Microsoft Outlook, to receive the file and use multi-media software, such as Microsoft Media Player, and picture-viewing software to view the file. In addition, he or she can also use the Internet fax software of the present invention to receive and view the file.

The server in the present invention, such as the first server A or the second server B, has an employee list of the company. If the file needs to be transferred among the employees of the same company, the server can deliver the file according to the employee list. If other companies or employees are also included in the list via registration, the file can be delivered in the same way. Moreover, the file is not limited to common e-mails. Moreover, when the file is sent out, all of the video message and content are still queued on the server and a user can download the file from the server at a later time.

Figure 2B:
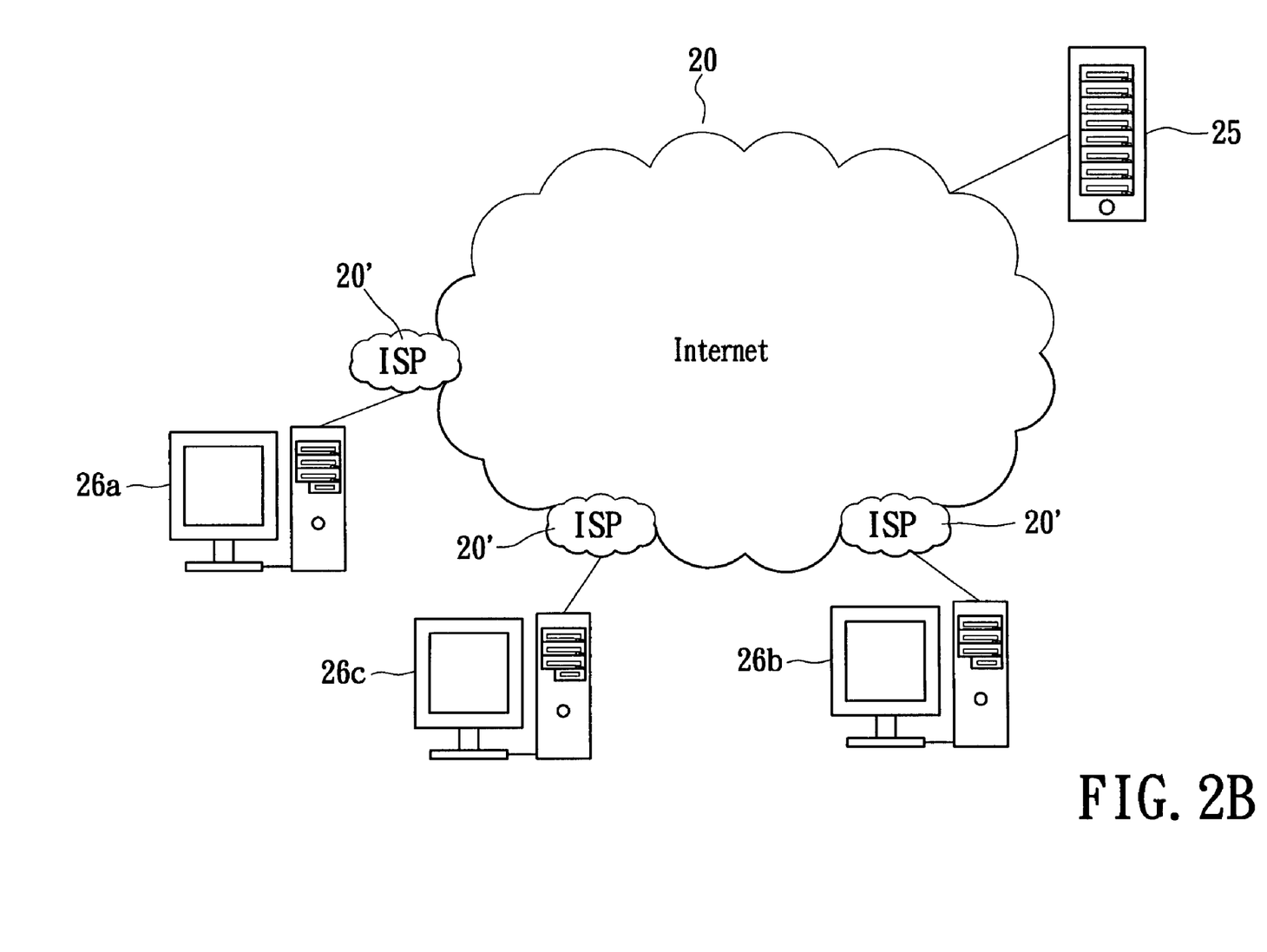
FIG. 2B is a structural diagram of the second embodiment in accordance with the present invention.

Reference is made to FIG. 2B, which is another structural diagram of a preferred embodiment in compliance with the present invention. As shown in the figure, if there is not an internal server as shown in FIG. 2A, a user who has registered can log on to the remote server 25 via the Internet 20. The user can connect with the Internet 20 via an Internet Service Provider (ISP) 20'. He or she can use a computer 26a, 26b or 26c and the Internet fax software of the present invention to receive or send the file. Moreover, he or she can also send the file by e-mail. When another user receives the e-mail, they can use multi-media software inside the computer such as Microsoft Media Player, Real Player or another picture-viewing programs to read the file.

Figure 2C:
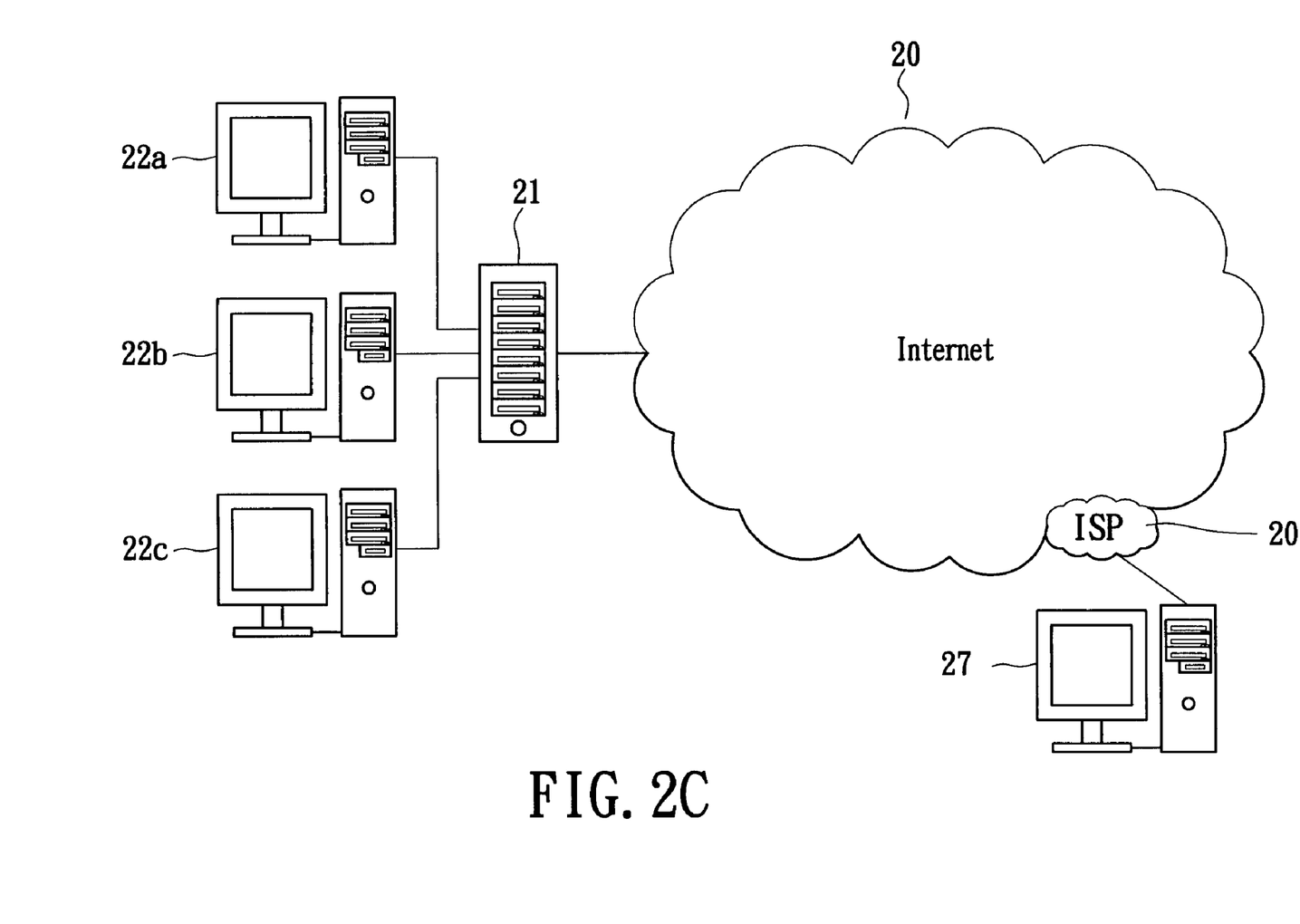
FIG. 2C is a structural diagram of the third embodiment in accordance with the present invention.

Reference is made to FIG. 2C, which is yet another structural diagram of a preferred embodiment in compliance with the present invention. As shown in the figure, a user can use a computer 22a, 22b or 22c connected to a specific server 21 to send a file attached with video messages to another remote user who isn't registered on the server 21. The remote user can use a computer 27 connected to the Internet via the ISP 20' to receive the file as an e-mail. After the file is received, the multi-media software or other picture-viewing programs installed on the computer 27 are automatically activated for the user to view the file.

It should be noted that the foresaid architectures of the embodiments complied with the present invention can be further extended and implemented according to the prior art.

Figure 3:
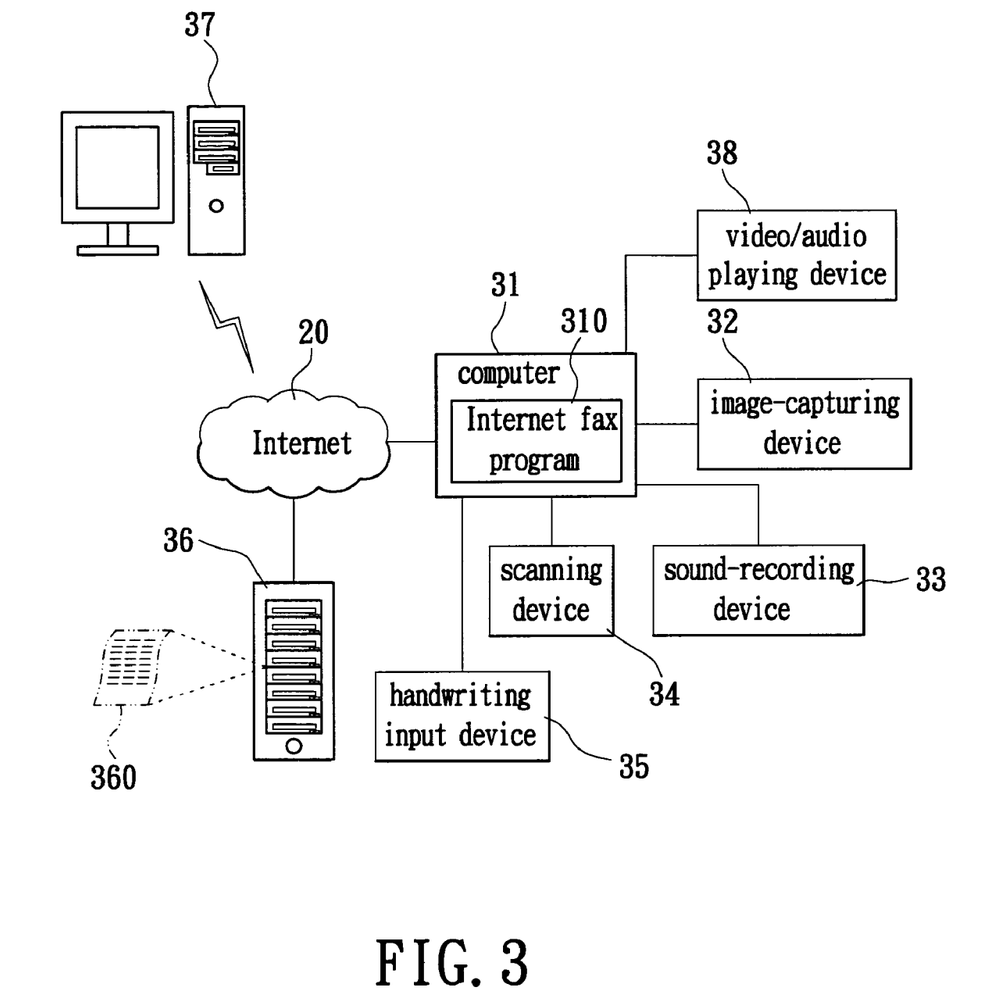
FIG. 3 is block diagram of an Internet fax apparatus in accordance with the present invention.

Reference is made to FIG. 3, which is a schematic diagram of a preferred embodiment in accordance with the present invention. By using the apparatuses shown in this figure, a fax function for the free transfer of video files can be achieved. Therein, the computer 31 has an Internet fax program 310 installed therein. The Internet fax program can provide video, handwriting and scanning functions. Furthermore, the computer 31 is connected to peripherals, including an image-capturing device 32, such as an Internet camera (Internetcam) or a digital camera (DV, D8 or V8), a built-in or external sound-recording device 33, such as a microphone, a scanning device 34, such as a scanner or a multi-function printer, a handwriting input device 35 for handwriting or drawing, and a video/audio playing device 38, such as a monitor or a speaker. The computer 31 is also connected to the Internet 20. Thus, the computer 31 can be used to send black-and-white or color pictures to the computer 37 at the other end by e-mail. The connection to the devices mentioned above or the Internet can be achieved in a wired or wireless manner.

As shown in FIG. 3, the present invention has a server 36 connected to the Internet 20. The server 36 can be disposed at a local end or a remote end and has a user or member list 360 stored therein. When a file attached with a black-and-white or color video message is transferred, the server 36 looks up the list 360 and queues the file in the memory. When a receiver is online, he or she can download the file via various recognition or identification methods and use corresponding hardware or software to view it. Shutting down the computer doesn't affect the functionality of the present invention. Furthermore, the file can be delivered to multiple receivers at a time.

The Internet fax program 310 functions via the combination of the computer 31 and the scanning device 34. Furthermore, some functions of the computer 31 can be built into the scanning device 34. Thereby, a user can easily send the file by pressing several function keys of the scanning device 34.

Figure 4A:
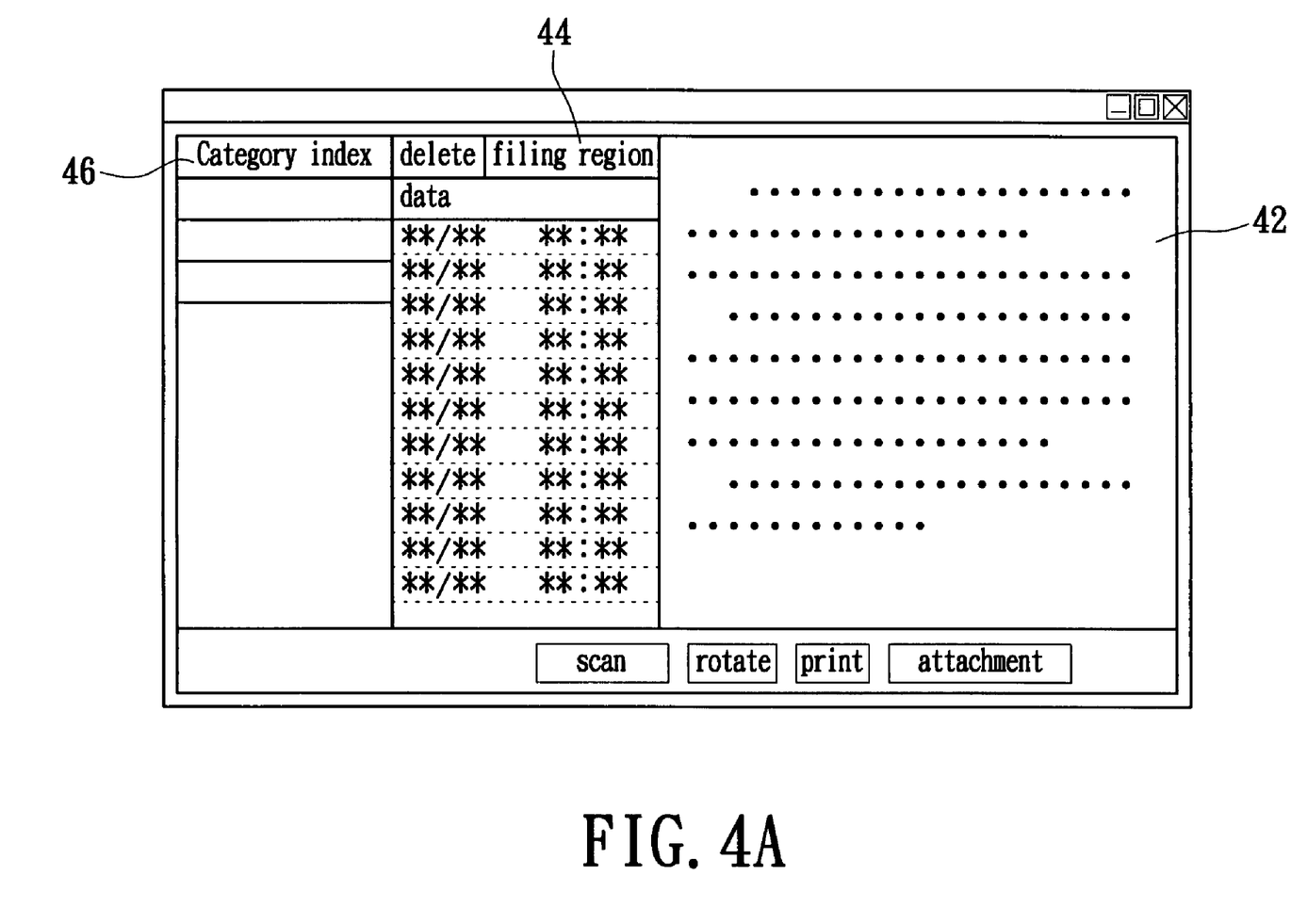
FIG. 4A is a schematic diagram for illustrating the filing system of the Internet fax program in accordance with the present invention.

In the present invention, when a file is scanned, the corresponding image file is automatically stored in a filing system, which has indexes for filing the files. As shown in FIG. 4A, when a file is scanned or selected, it is shown in a preview region 42. At the same time, a filing region 44 is also shown. After the file is scanned, the file is automatically filed by time and date so that the saving or filing procedure can be simplified. Besides, the present invention also has filing and deleting functions. Hence, a user can manually file or delete the file. The user can build up a category index according to the attributes of the scanned file so that the file can be found easily. Moreover, the user can add a video file via the filing system. He or she can use a video-recording program to record a video message and attach it to the file for viewing at a later time.

Figure 4B:
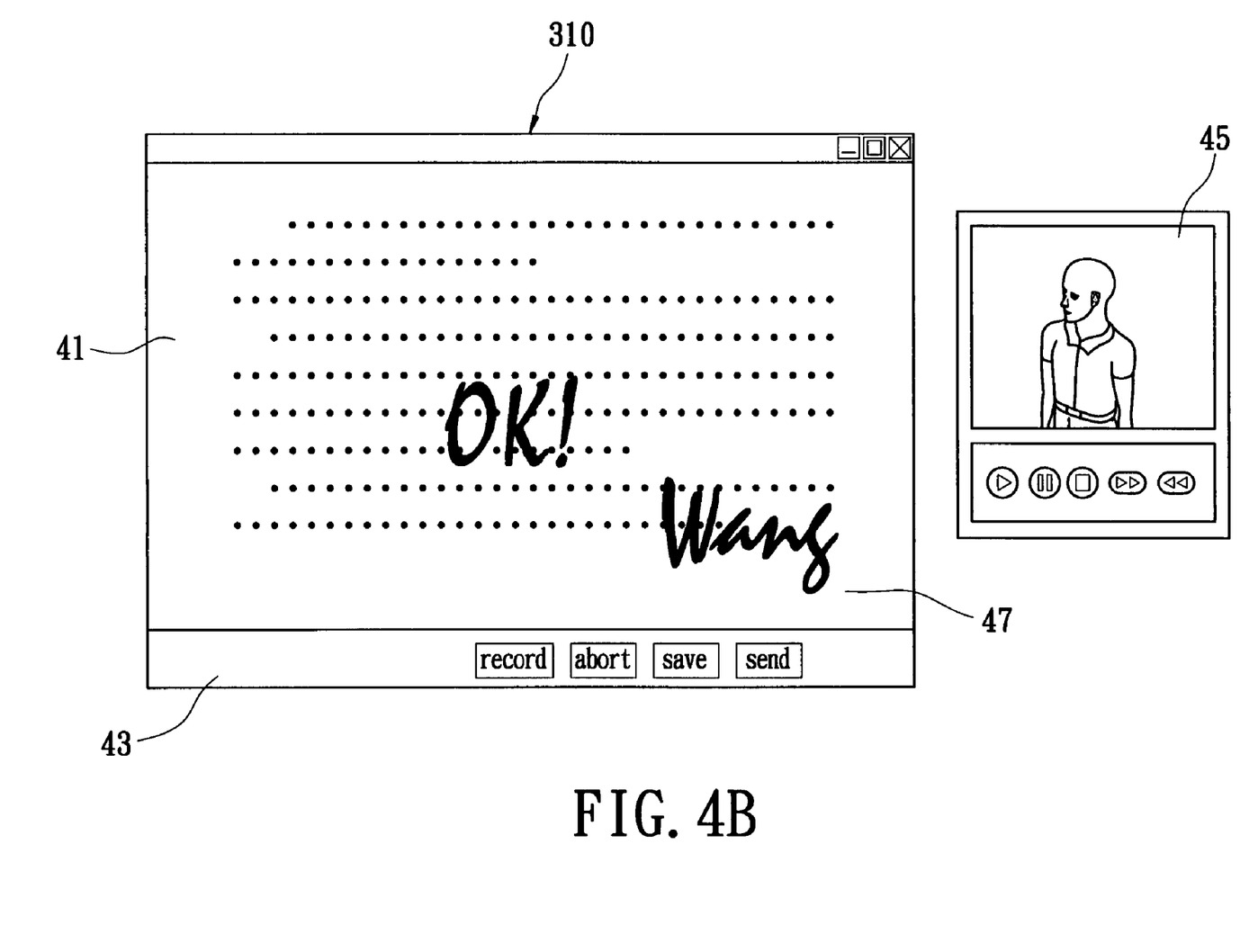
FIG. 4B is a schematic diagram for illustrating the Internet fax program in accordance with the present invention.

Reference is made to FIG. 4B, which is a schematic diagram illustrating the Internet fax program in accordance with the present invention. When a scanner scans a file and produces a digital image 41 thereby, the digital image 41 is simultaneously received by the Internet fax program 310 and shown on a monitor. The Internet fax program 310 provides a function region 43 at least including "add", "record", "abort", and "save" items. The present invention is limited thereto and can be extended to have more functions as necessary. If the user needs to add a video attachment, they can select the "add" item to activate the video-recording program 45 of the Internet fax program and then record a video message thereby. Likewise, they can write down an explanatory note on the digital image 41 via a handwriting input device as handwritten text 47 shown in FIG. 4B. After composing the file, the user can select a "send" item to transfer it by a server or e-mail function. When a receiver receives the file, he or she can view the file image together with the video and handwriting contents.

Figure 5:
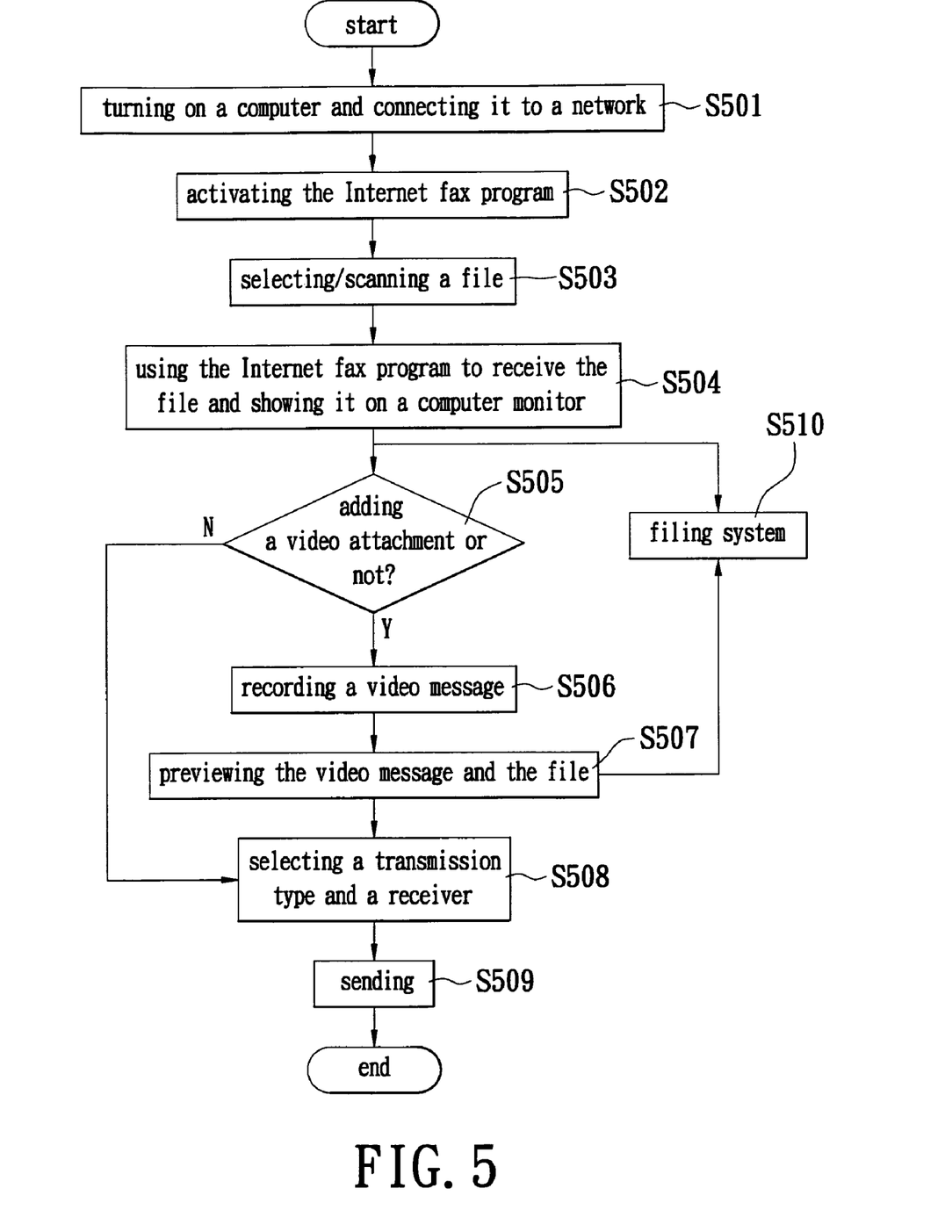
FIG. 5 is a flowchart of an Internet fax method in accordance with the present invention.

Reference is made to FIG. 5, which is a flowchart for illustrating the operation of the Internet fax apparatus in accordance with the present invention. When a computer, connected with various peripherals such as video, handwriting or scanning devices, is used to transfer a file, it includes the following steps.

Step S501: initially, the computer is turned on and connected to a network. In the embodiment of the present invention, the computer needs to be connected to a server having a user list (or receiver list) via the network. The server can identify the user's identity via a password, an account number or an identity chip. At this step, the user needs to confirm that the peripherals and software are installed correctly.

Step S502: At this step, the user needs to activate the Internet fax program provided in the present invention. The Internet fax program functions together with the video device and handwriting input device. The user can input a user list (or receiver list) via the Internet fax program or download the user list from the foresaid server.

Step S503: At this step, the user can use the scanning device connected to the computer to produce an electronic file by scanning or selecting an electronic file from the filing system. The image in this file can be rotated if necessary.

Step S504: The Internet fax program can receive the data of this electronic file in a wired or wireless manner and show it on a monitor. The user can print the file by using the Internet fax program if necessary. After that, the user can file the file via the filing system. The user can rotate the image in the file first and then file it.

Step S505: At this step, the user can decide whether they wish to add a video attachment and use the function items of the program to rotate, re-scan, send, abort, add video or handwritten text, or amend the image. If the user doesn't want to add a video attachment, they skip to step S508 once the user finishes amending the file.

Step S506: If the user decides to add a video attachment to the file, they can use the Internet fax program together with the image-capturing device and sound-recording device connected with the computer to record a video file. At the same time, he or she can write an explanatory note on the file.

Step S507: After recording the video message, the user can preview the contents of the video attachment and the file and determine whether they need to record the video message again. At this moment, the user can choose to store the file via the filing system of the Internet fax program (S510) or not.

Step S508: After the content of the file is confirmed, the user can select a transmission type and the receivers. They can select one or multiple receivers from the user list obtained from the server or an e-mail list.

Step S509: Finally, the user can select the "send" item to send out the file.

Figure 6:
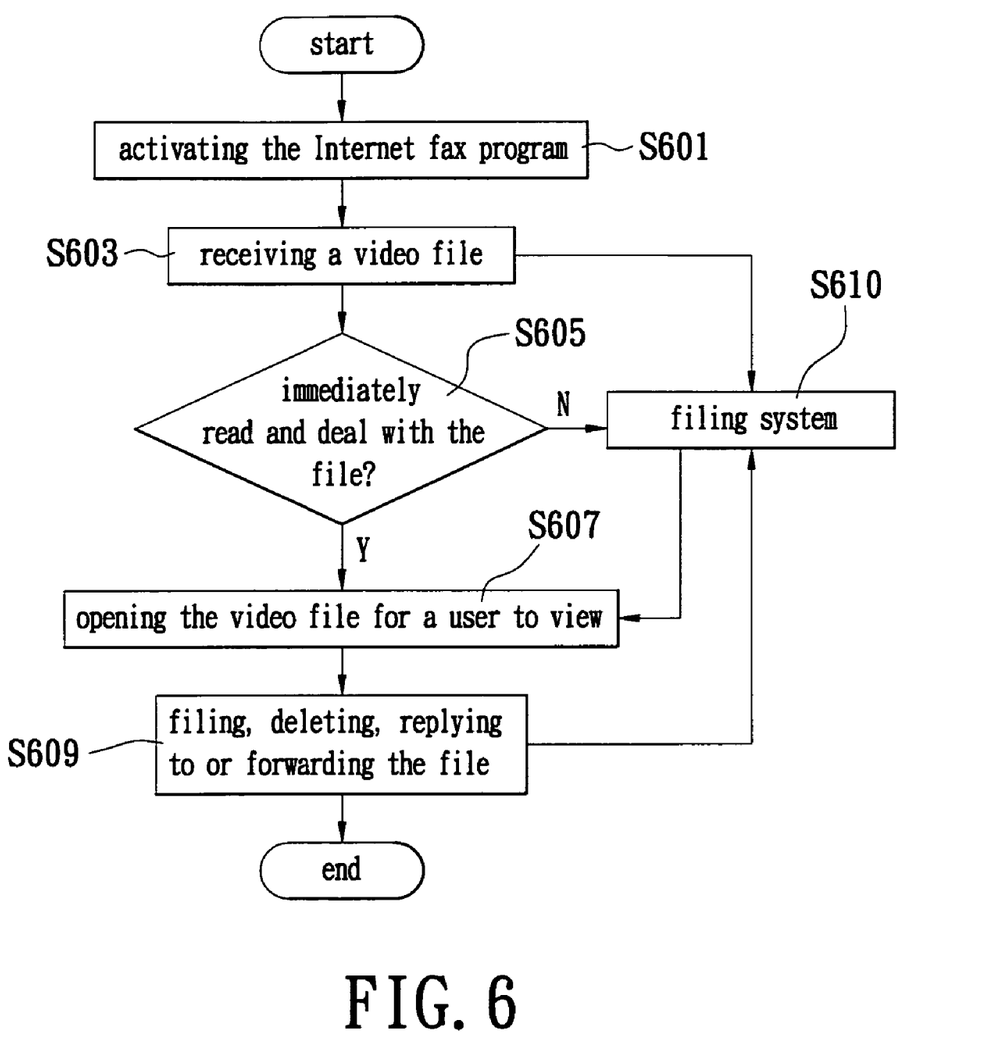
FIG. 6 is a flowchart for illustrating a receiving operation in accordance with the present invention.

Reference is made to FIG. 6, which is a flowchart for illustrating a receiving operation in accordance with the present invention. In the beginning, the user needs to turn on the computer and connect it to the network. Then, he or she needs to activate the Internet fax program (step S601) and log on to a server thereby. In the present invention, the server can identify the user's identity via a password, an account number or an identity chip. The user can then download the file from the server (step S603). At this moment, the filing system simultaneously processes the file and files it according to its category (step S610). Then, the user can determine whether it is necessary to read or deal with the file immediately (step S605). If the user decides not to read or deal with the file immediately, he or she can save it via the filing system. Otherwise, they can read the file just received or other files opened via the filing system (step S607).

Subsequently, the user can forward or reply to the file. The user can also add a video attachment to the file before it is forwarded or replied to. After the user deals with the file, they can choose to save, delete, reply or forward it (step S609). They can save the file via the filing system (step S610). If the receiver hasn't registered or logged on to the server, they can receive the file via the e-mail function. After the file is received, it automatically activates the multi-media software of the computer to display its content.

To sum up, the present invention provides an Internet fax apparatus and its method. By using a conventional scanner, a printer and the like together with the Internet fax program of the present invention, a user can add video or handwriting attachments to an electronic file. In this way, the present invention reduces the cost of sending a fax and provides a powerful and user-friendly fax function.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications should be embraced within the scope of the invention as defined in the appended claims.

What is claimed is:

1. An Internet fax method, which is implemented by means of an Internet fax program installed on a computer and an image-capturing device, a sound-recording device and a scanning device that are connected to a computer, the Internet fax method comprising:
   turning on a computer and connecting the computer to a network;
   activating the Internet fax program;
   connecting to a server having a receiver list;
   selecting a first electronic file or scanning a document to produce a second electronic file, wherein the first electronic file is selected via a filing system and the document is scanned via the scanning device;
   using the Internet fax program to receive the first electronic file or the second electronic file in a wireless or wired manner;
   determining whether a step of recording a video message needs to be performed;
   if the video message needs not to be recorded, sending the first or second electronic file immediately;
   if the video message needs to be recorded, recording the video message, which is achieved by using the Internet fax program together with the image-capturing device and the sound-recording device connected to the computer when the first or second electronic file is opened;
   previewing the video message and the first or second electronic file;
   selecting a transmission type and at least one receiver that is listed in the receiver list downloaded from the server via network; and
   sending the first or second electronic file attached with the video message.

2. The Internet fax method as claimed in claim 1, wherein the step of recording the video message further includes:
   using a handwriting input device to write an explanatory note on the first or second electronic file.

3. The Internet fax method as claimed in claim 1, wherein in the step of selecting the transmission type and the receiver, the receiver is selected from an e-mail list.

4. The Internet fax method as claimed in claim 1, wherein the Internet fax program includes a video-recording program.

5. The Internet fax method as claimed in claim 1, wherein in the step of previewing the video message and the first or second electronic file, the video message and the first or second electronic file are stored in the filing system.

6. The Internet fax method as claimed in claim 1, wherein after the step of selecting the first electronic file or scanning the document to producing the second electronic file is performed, the first or second electronic file has an image able to be rotated.

7. The Internet fax method as claimed in claim 1, further comprising:
   adding a video attachment in the filing system via a video-recording program.

8. The Internet fax method as claimed in claim 1, wherein after the step of scanning the document to produce the second electronic file is performed, the second electronic file is filed automatically.

9. An Internet fax method, which is implemented by means of an Internet fax program installed on a computer and an image-capturing device, a sound-recording device and a scanning device that are connected to a computer, the Internet fax method comprising:
   activating the Internet fax program;
   logging on to a server having a receiver list;
   receiving a video file and filing the video file via a filing system;
   determining whether the video file is to be viewed immediately or stored via the filing system;
   playing the video file for a user to view if the user decides to view; and
   storing the video file via the filing system if the user decides not to view.

10. The Internet fax method as claimed in claim 9, wherein after the step of opening the video file for the user to view is performed, the video file is replied to or forwarded.

* * * * *